(12) United States Patent
Hughes et al.

(10) Patent No.: US 6,320,849 B1
(45) Date of Patent: Nov. 20, 2001

(54) DYNAMIC CONTROL OF SEARCH DURATION IN A WIRELESS COMMUNICATION DEVICE

(75) Inventors: Robbin D. Hughes; Paul T. Williamson, both of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/346,368

(22) Filed: Jul. 1, 1999

(51) Int. Cl.[7] .................................................. H04B 15/00
(52) U.S. Cl. .............................................................. 370/310
(58) Field of Search ...................................... 370/342, 320, 370/335, 209, 441, 442, 311, 254, 252, 318, 338, 350; 375/130, 137, 140; 455/38.3, 38.1

(56) References Cited

U.S. PATENT DOCUMENTS 5,710,768 * 1/1998 Ziv et al. .............................. 370/335
5,805,648   9/1998 Sutton .................................. 375/367
5,867,527 * 2/1999 Ziv et al. .............................. 370/335

FOREIGN PATENT DOCUMENTS 9610873   4/1996 (WO) .............................. H04B/7/26

* cited by examiner

*Primary Examiner*—Dang Ton
(74) *Attorney, Agent, or Firm*—Philip R. Wodsworth; Charles D. Brown; George C. Pappas

(57) ABSTRACT

Microprocessor resource utilization by a searching process are controlled by determining a search window size, accessing a lookup table to determine an integration interval and a number of non-coherent passes, and commanding a searching process to execute a multipath search according to these parameters. The lookup table comprises a plurality of integration intervals and corresponding number of non-coherent passes indexed according to search window such that an execution duration of the search process remains nominally constant over a variety of search window sizes.

20 Claims, 8 Drawing Sheets

DYNAMIC CONTROL OF SEARCH DURATION IN A WIRELESS COMMUNICATION DEVICE

CROSS REFERENCE TO RELATED APPLICATIONS

The subject matter of U.S. patent application entitled "Dynamic Allocation of Microprocessor Resources In A Wireless Communication Device," U.S. patent application Ser. No. 09/346,369, filed concurrently herewith, is related to this application and is hereby incorporated by reference herein in its entirety.

FIELD OF THE INVENTION

The invention relates to communications telephone systems. In particular, the invention relates to signal searching in a wireless communications system.

BACKGROUND OF THE INVENTION

A wireless communication system may comprise multiple remote units and multiple base stations. FIG. 1 exemplifies an embodiment of a terrestrial wireless communication system with three remote units 10A, 10B and 10C and two base stations 12. In FIG. 1, the three remote units are shown as a mobile telephone unit installed in a car 10A, a portable computer remote 10B, and a fixed location unit 10C such as might be found in a wireless local loop or meter reading system. Remote units may be any type of communication unit such as, for example, hand-held personal communication system units, portable data units such as a personal data assistant, or fixed location data units such as meter reading equipment. FIG. 1 shows a forward link 14 from the base station 12 to the remote units 10 and a reverse link 16 from the remote units 10 to the base stations 12.

Communication between remote units and base stations, over the wireless channel, can be accomplished using one of a variety of multiple access techniques which facilitate a large number of users in a limited frequency spectrum. These multiple access techniques include time division multiple access (TDMA), frequency division multiple access (FDMA), and code division multiple access (CDMA). An industry standard for CDMA is set forth in the TIA/EIA Interim Standard entitled "Mobile Station - Base Station Computability Standard for Dual-Mode Wideband Spread Spectrum Cellular System", TIA/EIA/IS-95, and its progeny (collectively referred to here as IS-95), the contents of which are incorporated herein by reference. Additional information concerning a CDMA communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," (the '307 patent) assigned to the assignee of the present invention and incorporated in its entirety herein by reference.

In the '307 patent, a multiple access technique is disclosed where a large number of mobile telephone system users, each having a transceiver, communicate through base stations using CDMA spread spectrum communication signals. The CDMA modulation techniques disclosed in the '307 patent offer many advantages over other modulation techniques used in wireless communication systems such as TDMA and FDMA. For example, CDMA permits the frequency spectrum to be reused multiple times thereby permitting an increase in system user capacity. Additionally, use of CDMA techniques permits the special problems of the terrestrial channel to be overcome by mitigation of the adverse effects of multipath, e.g. fading, while also exploiting the advantages thereof.

In a wireless communication system, a signal may travel several distinct propagation paths as it is transmitted between base stations and remote units. The signal generated by the multipath characteristics of the wireless channel presents a challenge to the communication system. One characteristic of a multipath channel is the time spread introduced in a signal that is transmitted through the channel. For example, if an ideal impulse is transmitted over a multipath channel, the received signal appears as a stream of pulses. Another characteristic of the multipath channel is that each path through the channel may cause a different attenuation factor. For example, if an ideal impulse is transmitted over a multipath channel, each pulse of the received stream of pulses generally has a different signal strength than other received pulses. Yet another characteristic of the multipath channel is that each path through the channel may cause a different phase on the signal. For example, if an ideal impulse is transmitted over a multipath channel, each pulse of the received stream of pulses generally has a different phase than other received pulses.

In the wireless channel, the multipath is created by reflection of the signal from obstacles in the environment such as, for example, buildings, trees, cars, and people. Accordingly, the wireless channel is generally a time varying multipath channel due to the relative motion of the structures that create the multipath. For example, if an ideal impulse is transmitted over the time varying multipath channel, the received stream of pulses changes in time delay, attenuation, and phase as a function of the time that the ideal impulse is transmitted.

The multipath characteristics of a channel can affect the signal received by the remote unit and result in, among other things, fading of the signal. Fading is the result of the phasing characteristics of the multipath channel. A fade occurs when multipath vectors add destructively, yielding a received signal that is smaller in amplitude than either individual vector. For example if a sine wave is transmitted through a multipath channel having two paths where the first path has an attenuation factor of X dB, a time delay of $\delta$ with a phase shift of $\Theta$ radians, and the second path has an attenuation factor of X dB, a time delay of $\delta$ with a phase shift of $\Theta+\pi$ radians, no signal is received at the output of the channel because the two signals, being equal amplitude and opposite phase, cancel each other. Thus, fading may have a severe negative effect on the performance of a wireless communication system.

A CDMA communications system is optimized for operation in a multipath environment. For example, the forward link and reverse link signals are modulated with a high frequency pseudonoise (PN) sequence. The PN modulation allows the many different multipath instances of the same signal to be separately received through the use of a "rake" receiver design. In a rake receiver, each element within a set of demodulation elements can be assigned to an individual multipath instance of a signal. The demodulated outputs of the demodulation elements are then combined to generate a combined signal. Thus, all of the multipath signal instances must fade together before the combined signal experiences a deep fade.

In the remote unit, a microprocessor is used to assign demodulation elements to the available multipath signal instances. A search engine is used to provide data to the microprocessor concerning the multipath components of the received signal. The search engine measures the arrival time and amplitude of the multipath components of a pilot signal transmitted by the base stations. The effect of the multipath environment is the same on the pilot signal and the data signal. Determining the multipath environment's effect on the pilot signal allows the microprocessor to assign demodulation elements to the data channel multipath signal instances.

The search engine determines the multipath components of the pilot signal by "searching" through a sequence of potential path offsets and measuring the energy of the pilot signal received at each of the potential path offsets. The microprocessor evaluates the energy associated with a potential offset, and, if it exceeds a certain threshold, assigns a signal demodulation element to that offset. A method and apparatus of demodulation element assignment based on searcher energy levels is disclosed in U.S. Pat. No. 5,490,165 entitled "DEMODULATION ELEMENT ASSIGNMENT IN A SYSTEM CAPABLE OF RECEIVING MULTIPLE SIGNALS" assigned to the assignee of the present invention.

FIG. 2 shows an exemplary set of multipath signal instances of a single pilot signal from a base station arriving at a remote unit. The vertical axis represents the power received in decibels (dB). The horizontal axis represents the delay in the arrival time of a signal instance due to multipath delays. The axis (not shown) going into the page represents a segment of time. Each signal spike in the common plane of the page has arrived at the remote unit at a common time but has been transmitted by the base station at a different time. Each signal spike 22–27 has traveled a different path and therefore exhibits a different time delay, a different amplitude, and a different phase response. The six different signal spikes represented by spikes 22–27 are representative of a severe multipath environment. Typical urban environment produces fewer usable paths. The noise floor of the system is represented by the peaks and dips having lower energy levels. The task of the search engine is to identify the delay, as measured by the horizontal axis, and amplitude, as measured by the vertical axis, of signal spikes 22–27 for potential demodulation element assignment.

Note, as shown in FIG. 2, each of the multipath peaks varies in amplitude as a function of time as shown by the uneven ridge of each multipath peak. In the limited time shown, there are no major changes in the multipath peaks. Over a more extended time range, multipath peaks disappear and new paths are created as time progresses. Multipath peaks are likely to merge together or blur into a wide peak over time. The system microprocessor steps the search engine through a set of offsets, called a search window, that is likely to contain one or more multipath signal peaks suitable for assignment to a demodulation element. For each offset, the search engine reports the energy it found at that offset back to microprocessor. Demodulation elements may then be assigned by microprocessor to the paths identified by the search engine (i.e. the timing reference of their PN generators is moved to align it to that of the found path). Once a demodulation element has locked onto the signal at its assigned offset, it then tracks that path on its own without microprocessor supervision, until the path fades away or until the demodulation element is assigned to another path by the microprocessor.

In a communication system based on the industry standard for CDMA, IS-95, each of the multiple base stations transmits a pilot signal having a common PN sequence. Each base station transmits the pilot signal offset in time from neighboring base stations so that the signals can be distinguished from one another at the remote unit. At any given time, the remote unit may receive a variety of signals from multiple base stations. Using a copy of the PN sequence, which is generated at the remote unit, the entire PN space can be searched by the remote unit. Using the search results, the microprocessor distinguishes the multiple base stations based on the time offset.

FIG. 3 shows an extended portion of PN space on the horizontal axis. The groups of peaks 30, 32 and 34 represent transmissions from three different base stations. As is seen, the signal from each base station signal experiences a different multipath environment. Also, each base station has a different PN offset from the PN reference 36. Thus, the microprocessor may select a set of PN offsets corresponding to a search window for any of the identified base stations. This allows the remote unit to simultaneously demodulate signals from multiple base stations by assigning demodulation elements appropriately.

The multipath environment is constantly changing as the remote unit moves about in the base station coverage area. The number of searches that must be performed is set by the need to find multipath quickly enough so that the path may be put to good use by the demodulation elements. As the multipath environment changes, the search engine must complete searches quickly to support demodulation element assignment. However, following the completion of a search, the microprocessor must evaluate the search results and transfer new search parameters to the search engine for use in the next search. This evaluation and transfer of new search parameters consumes significant microprocessor resources. As searches are completed quicker, thereby shortened in duration, excessive amounts of microprocessor resources may be required in the search evaluation process and in otherwise servicing the search engine. This increase in microprocessor resource utilization by the search engine can eventually lead to the inability of lower priority tasks to receive adequate microprocessor resources required for proper operation of the remote unit.

Therefore, there is a need in the art for a method and apparatus for controlling a search engine to regulate the amount of microprocessor resources dedicated to control of the searching process while still fulfilling necessary performance requirements of the searching process.

SUMMARY OF THE INVENTION

The invention improves the allocation of microprocessor resources of a remote unit in a wireless communications system. According to the invention, a microprocessor controls the duration of a search through the selection of appropriate search parameters. Search duration affects the portion of the microprocessor resources that are required to service the search engine. If the search duration is too short excessive amounts of the microprocessor resources may be dedicated to the search engine or searching process. In the invention, the search duration is controlled to be nominally constant, or a desired duration, independent of search window size. Making the search duration independent of window size allows the microprocessor to maintain a relatively constant, or desired, load from the search engine even if search requirements dictate a different search window size. This control of the search duration is advantageous because it provides the microprocessor some control over the load placed on it by the search engine.

According to the invention, the microprocessor, using various criteria such as the current wireless link operating conditions, determines a desired size of a search window.

Using the search window size as an index, the microprocessor retrieves a set of search parameters from a lookup table and passes these parameters to the search engine. The search parameters in the lookup table are selected so as to produce a search which is nearly constant, or of a desired duration independent of the search window size.

The search parameters in the lookup table comprise the integration interval and number of non-coherent passes. The integration interval determines the period which the search engine "dwells" at each PN offset within the search window, integrating the signal energy, as the search engine steps through the search window. The number of non-coherent passes defines the number of times the search engine steps through the PN offsets designated by the search window. Because the integration interval and number of non-coherent passes affect the amount of time required to process a complete search, the duration of a search window can be controlled by selection of these parameters. A single lookup table can be built corresponding to one nominal search duration, or a family of lookup tables can be built, wherein each table has values of integration interval and number of non-coherent passes corresponding to a different search duration.

BRIEF DESCRIPTION OF THE DRAWINGS

The features, objects and advantages of the present invention will become more apparent from the detailed description set forth below when taken in conjunction with the drawings in which like references characters identify correspondingly throughout, and wherein.

DETAILED DESCRIPTION OF THE INVENTION

The invention improves the allocation of microprocessor resources of a remote unit in a wireless communications system. According to the invention, a microprocessor determines a desired initial PN offset and a desired size of a search window. Using the search window size as an index, the microprocessor retrieves a set of search parameters from a lookup table and passes these parameters to the element executing the searching processes such as a search engine. The search parameters in the lookup table are selected so as to produce a search which is nearly constant, or of a desired duration, independent of the search window size.

Figure 4:
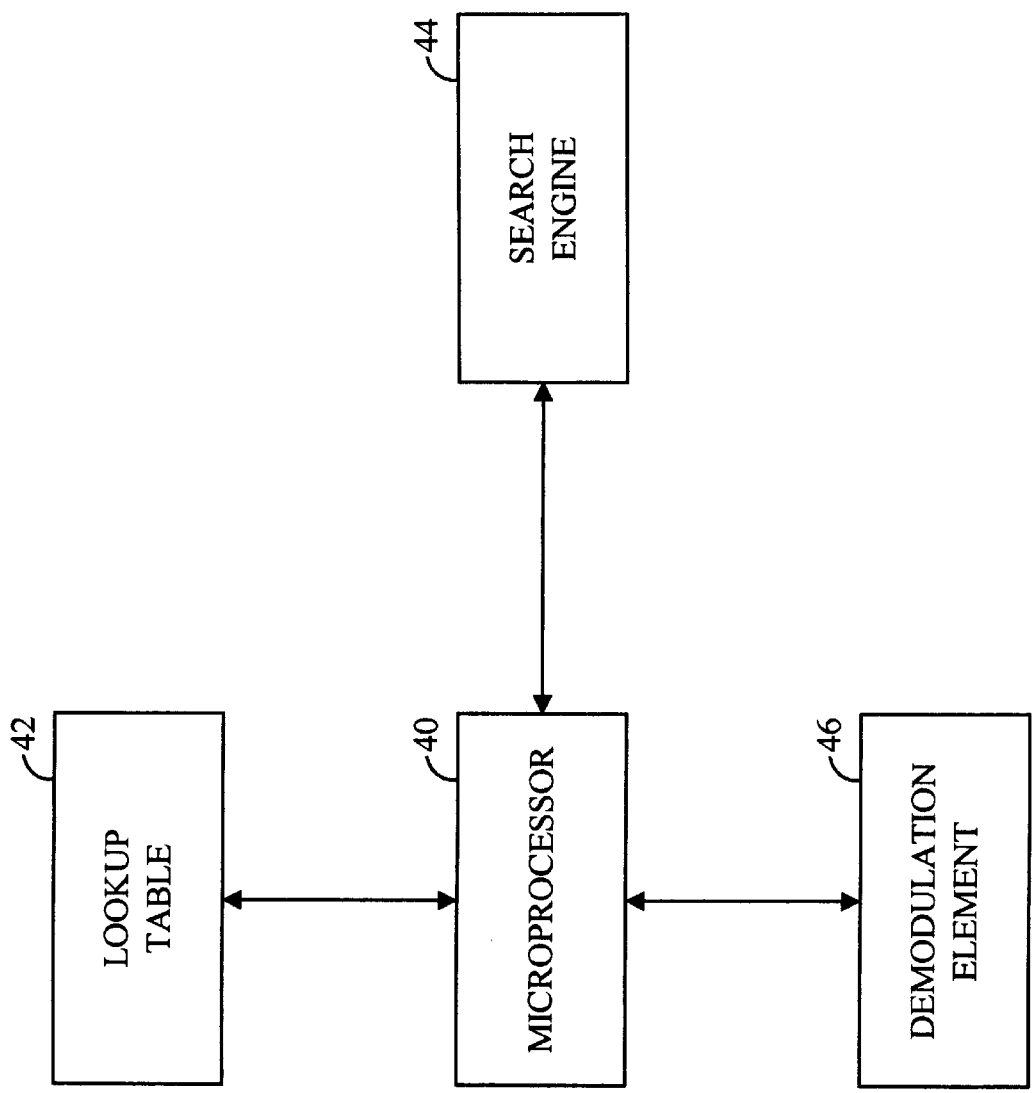
FIG. 4 is a block diagram of a remote unit search system.

One embodiment of a searching process is described in relation to FIG. 4. At the beginning of the search process, a microprocessor 40 determines the desired initial PN offset for the search window and the desired search window size, such as, for example, according to well-known techniques for signal searching. Following this determination the microprocessor 40, using the search window size as an index, retrieves search parameters from a lookup table 42. The search parameters comprise an integration interval and a number of non-coherent passes. The integration interval determines the period which the search engine "dwells" at each PN offset within the search window, integrating the signal energy, as the search engine steps through the search window. The number of non-coherent passes defines the number of times the search engine steps through the PN offsets designated by the search window. Because the integration interval and number of non-coherent passes affect the amount of time required to process a complete search, the duration of a search can be controlled by selection of these parameters. In general, a longer integration interval produces a better signal to noise ratio. However, as described above, if the multipath environment produces a fade, as a result of multipath vectors adding destructively, a longer integration interval may not improve the signal to noise ratio. Search results may improve through an increase in the number of non-coherent passes because the multipath environment may change between passes allowing detection of a multipath instance which is faded on an initial pass to be detected during a subsequent pass in the same search.

Figure 5:
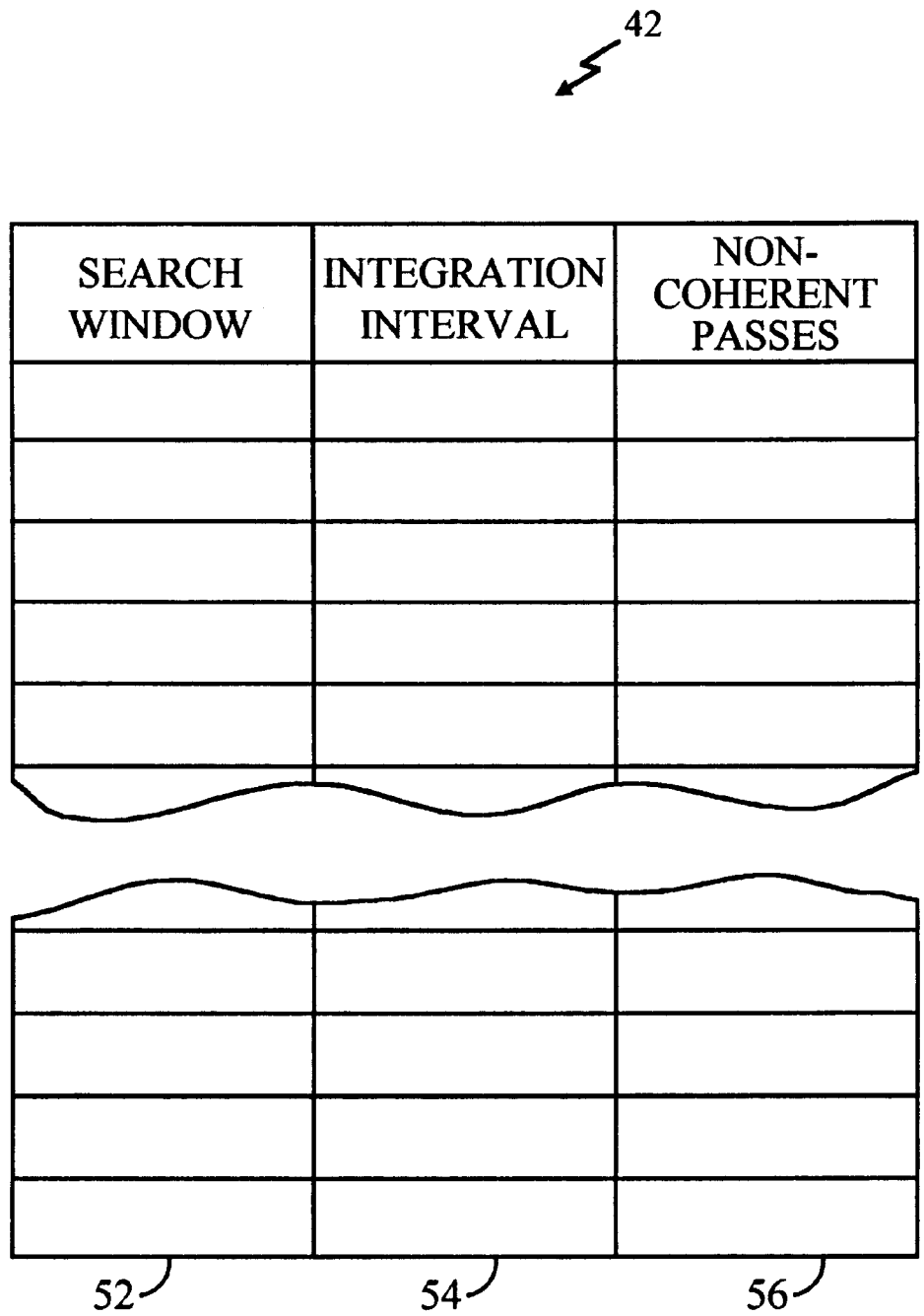
FIG. 5 is a chart showing the data structure of the search parameter lookup table.

FIG. 5 shows one embodiment of the data structure of a search parameter lookup table 50. The lookup table contains three columns of data 52, 54 and 56. Column 52 contains the size of the search window. The search window size is used by the microprocessor as an index into the table. Column 54 contains values of integration interval, and column 56 contains values for the number of non-coherent passes, corresponding to the search window size. Each row of the lookup table contains predetermined values for the integration interval and number of non-coherent passes corresponding to the search window size in column 52 of the row.

Selection of the search window size, integration interval and number of non-coherent passes establishes a search duration. As explained below, the search duration affects the loading requirements placed on the microprocessor 40 by the search process. Therefore, controlling the search duration provides some control over the loading requirements on the microprocessor 40.

To obtain a constant, or desired, search duration independent of search window size, values for integration interval and number of non-coherent passes for a corresponding search window size are determined. Knowing the rate that the search engine steps from one PN value to the next during a search, and the search window size, allows determination of appropriate values for the integration interval and the number of non-coherent passes. In the embodiment shown in FIG. 5, a single lookup table 42 is loaded with predetermined values of integration interval and number of non-coherent passes for a corresponding search window. Therefore, by obtaining search parameters from the lookup table 42 the microprocessor 40 can ensure a constant, or desired, search duration during operation. In an alternate embodiment, only the number of non-coherent passes or the integration interval varies to determine the search duration rather than both.

Figure 6:
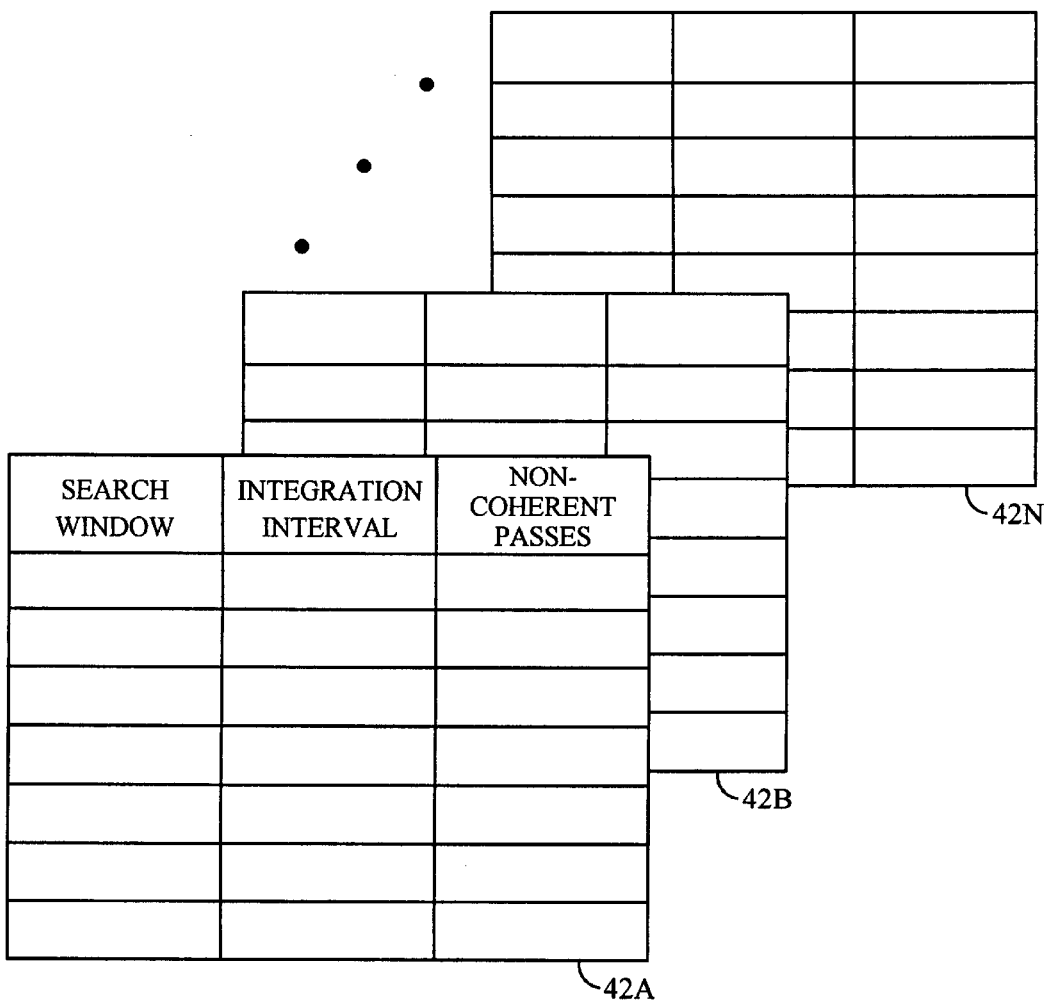
FIG. 6 is a chart showing an embodiment of the invention which uses a plurality of search parameter lookup tables.

In another embodiment, shown in FIG. 6, there are a plurality of lookup tables 42A–42n. Each of the individual lookup tables contains values of integration interval and number of non-coherent passes corresponding to different search duration for the same search window size. That is, the lookup table 42A may contain integration intervals and number of non-coherent passes which produce a search duration of, for example, approximately 1 millisecond (msec) for any search window size. The lookup table 42B may contain integration intervals and number of non-coherent passes which produce a search duration of, for example, approximately 2 msec for any search window size. Additional tables may contain values of integration intervals and number of non-coherent passes so as to produce searches of different duration for the same size search window. Thus, a family of lookup tables 42A –42n, which produce different search duration for the same size search window, may be built. This feature allows the microprocessor 40, through use of the appropriate lookup table 42A –42n, to select a desired search duration from a family of available search durations, for a selected search window size.

In yet another embodiment, the microprocessor 40 determines the search parameters "on-the-fly." That is, the microprocessor 40 may calculate a desired integration interval and number of non-coherent passes dependent on the search window size. Thus the microprocessor 40 may, by selecting appropriate values for the integration interval and number of non-coherent passes, produce a search duration which is constant.

The remote unit may control search duration in order to efficiently allocate microprocessor resources. While the microprocessor is servicing the searching process, the microprocessor is unable to service other tasks. If the search duration can be increased, without sacrificing search results, more of the microprocessor resources can be dedicated to other tasks, Additional information concerning the allocation of microprocessor resources in the remote unit are disclosed in the above referenced U.S. patent application, Ser. No. 09/346,369, entitled "DYNAMIC ALLOCATION OF MICROPROCESSOR RESOURCES IN A WIRELESS COMMUNICATION DEVICE" filed concurrently with the present application.

Figure 1:
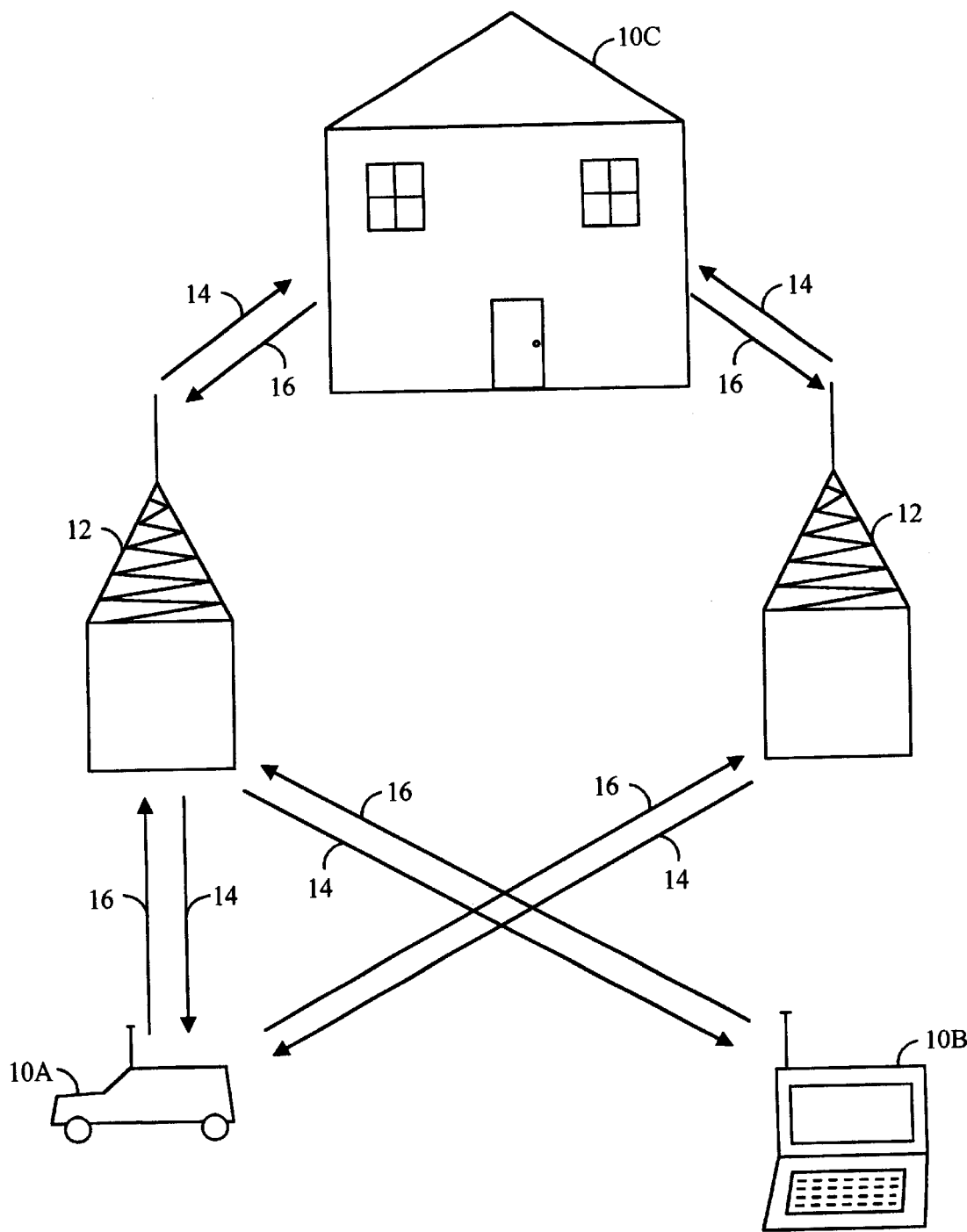
FIG. 1 is a block diagram showing a typical modern wireless communication system.
Figure 2:
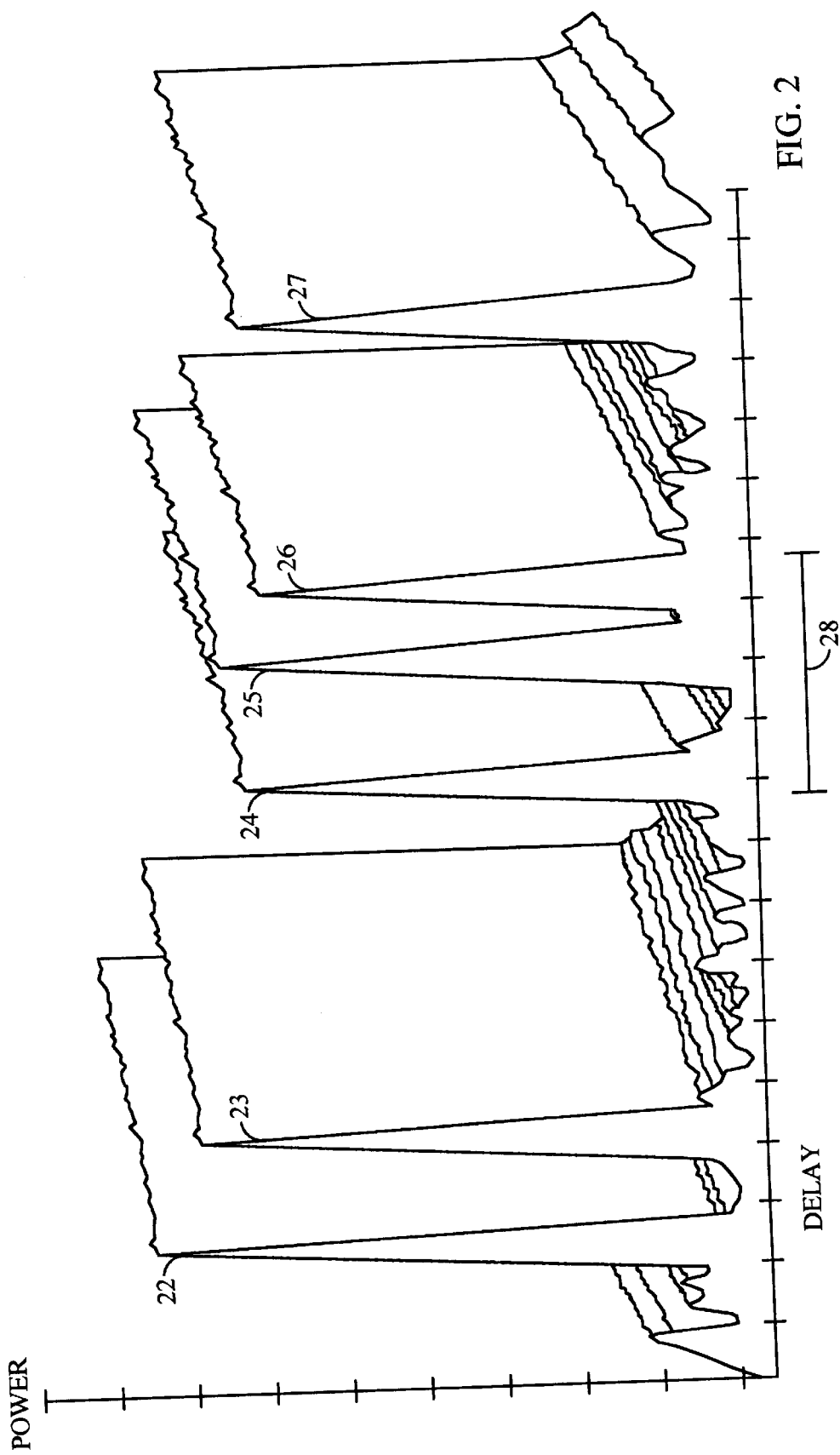
FIG. 2 is a graph showing an exemplifying set of multiple signal instances of a pilot signal from a single base station arriving at a remote unit.
Figure 3:
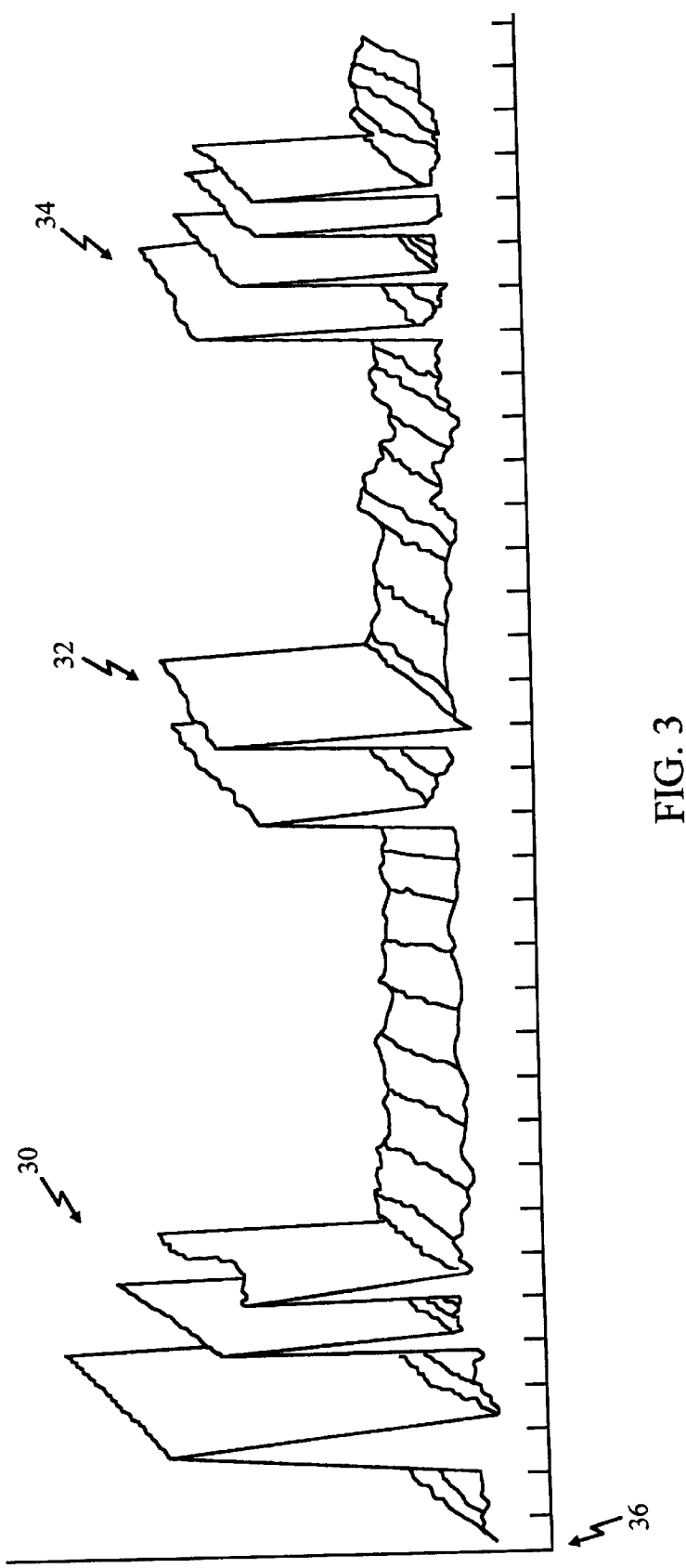
FIG. 3 is a graph showing an exemplifying set of multiple signal instances of pilot signals from multiple base stations arriving at a remote unit.

The microprocessor 40, after selecting the desired search parameters, passes the initial PN offset, search window size and the search parameters from the table to the search engine 44. The search engine 44, using the search parameters, performs a search according to well-known techniques. For example, during the search process, the search engine 44 steps through the search window. In FIG. 2, the horizontal axis of delay can be thought of as PN chip offsets. Time segment 21 represents a search window. The start of the search window is delayed from the reference PN time by a period corresponding to a number of chips after the initial PN offset. The length of the search window is determined by the search window size. During the searching process, the search engine 44 steps through the search window. At each one-half chip offset, the search engine 44 demodulates, integrates, and measures the signal power for the period defined by the integration interval. After stepping through the entire search window, the search engine 44 performs another search through the same search window if the number of non-coherent passes is set to a value greater than one. In such a case, the search engine 44 continues stepping through the search window, combining the measured signal power with the previously measured signal power at each PN offset, until the search window has been searched a number of times as defined by the number of non-coherent passes.

At the completion of the search task, the search engine 44 has collected a table comprising signal power measured at each PN offset within the search window. All or a portion of the table is then passed to the microprocessor 40 for evaluation. Based on evaluation of the search results, the microprocessor 40 may assign or reassign demodulation elements 46. For example, if the multipath environment has changed, the microprocessor 40 may reassign a demodulation element 46 to a new PN delay, or unassign the demodulation element 46.

Figure 7:
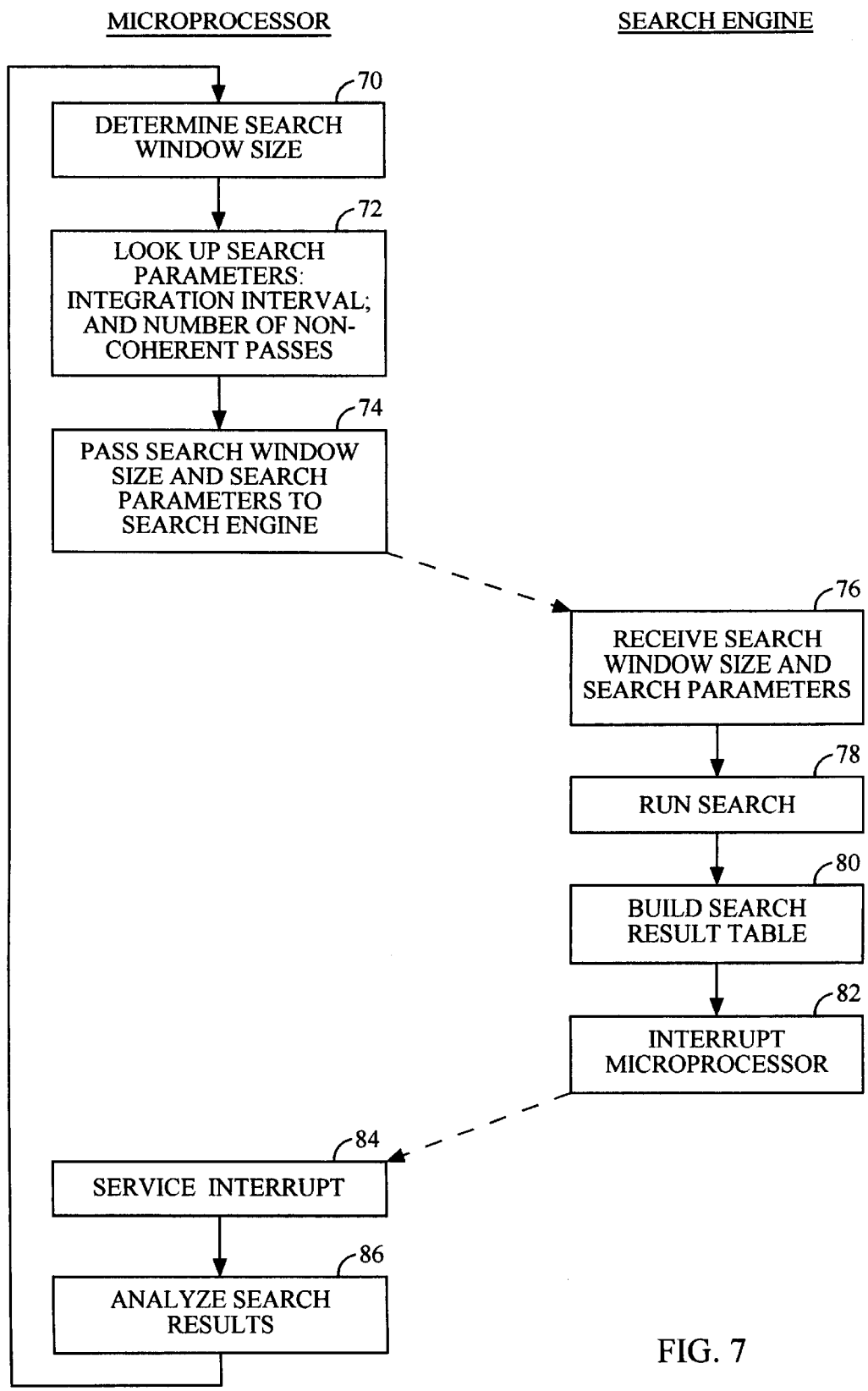
FIG. 7 is a flow chart showing operation of the microprocessor and search engine in a remote unit search system.

FIG. 7 is a flow chart of one embodiment of the invention showing the tasks performed by the microprocessor 40 and search engine 44 during a search process. Using various criteria the microprocessor 40 selects a desired PN offset and search window size in block 70, according to well known techniques. In block 72, using the selected search window size as an index the microprocessor 40 references a lookup table 42 to retrieve the corresponding integration interval and number of non-coherent passes. In block 74, the microprocessor 40 passes an initial PN offset, the search window size and search parameters to the search engine 44. In block 76, the search engine 44 receives the initial PN offset, the search window size and search parameters from the microprocessor 40. In block 78, the search engine performs the searching process.

In block 80, the search engine 44 builds a table of the search results. When the search table is completed, in block 80, the search engine 44 interrupts the microprocessor 40. In block 84, the microprocessor 40 acknowledges the search engine 44 interrupt. In block 86, the microprocessor 40 analyzes the search results. In block 70, the microprocessor 40 selects a new initial PN offset and a new search window size and the above procedure is repeated.

Figure 8:
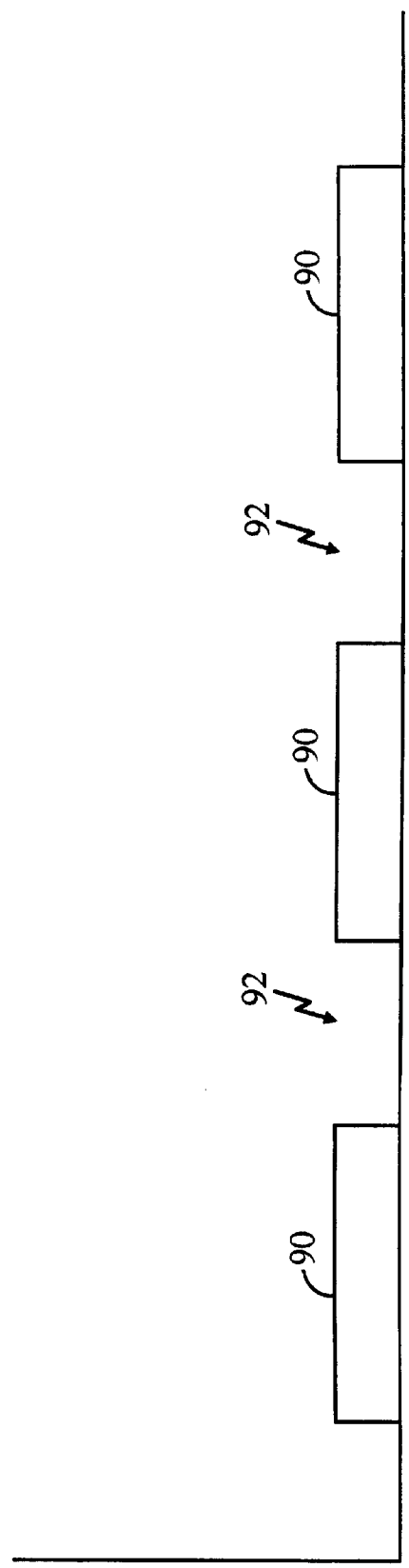
FIG. 8 is a graph showing relative microprocessor resource utilization by the search engine.

FIG. 8 illustrates allocation of the resources of the microprocessor 40 as described in the above embodiment. In FIG. 8, the horizontal axis represents time. The time segments 90 represent the periods when the microprocessor is dedicated to the search process, and correspond to blocks 70–74 and 84–86 at FIG. 7. During the time segments 90 the microprocessor 40 is dedicated to servicing the search process, analyzing search results and determining new search parameters and the like, and is not available to perform other tasks. During the time segments 92, a search is being performed and the search process does not require any microprocessor 40 resources. Therefore, during the time segments 92, the resources of the microprocessor 40 are available to perform other tasks. The time segments 92 corresponds to blocks 76–82 of FIG. 7.

As illustrated in FIG. 8, if the duration of the time segments 92 decreases, assuming the duration required by the microprocessor 40 to service the search process remains nearly constant, the search process consumes a higher percentage of the total resources of the microprocessor 40. Therefore, to ensure that an excessive amount of resources of the microprocessor 40 are not dedicated to servicing the search process, an appropriate integration interval and number of non-coherent passes for a corresponding search window size should be selected. By selecting the appropriate values, the duration of the search may be controlled to be a constant or other desired period, allowing for sufficient resources of the microprocessor 40 to be available for other activities.

More information concerning the searching process, demodulating element assignment and search engines can be found in:

(1) U.S. Pat. No. 5,644,591, entitled Method and Apparatus for Performing Search Acquisition in a CDMA Communications System;

(2) U.S. Pat. No. 5,805,648, entitled Method and Apparatus for Performing Search Acquisition in a CDMA Communications System;

(3) U.S. Pat. No. 5,760,768, entitled Method and System for Customizing a User Interface in a Computer System;

(4) U.S. Pat. Nos. 5,867,527 and 5,867,527, entitled Method of Searching for a Bursty Signal;

(5) U.S. Pat. No. 5,764,687, entitled Mobile Demodulator Architecture For a Spread Spectrum Multiple Access Communication System;

(6) U.S. Pat. No. 5,577,022, entitled Pilot Signal Searching Technique for a Cellular Communications System;

(7) U.S. Pat. No. 5,577,022, entitled Cell Site Demodulation Architecture For A Spread Spectrum Multiple Access Communication Systems;

(8) Application Ser. No. 08/987,172, entitled Multi Channel Demodulator filed on Dec. 9, 1997; and (9) Application Ser. No. 09/283,010, entitled Programmable Matched Filter Searcher, filed on Mar. 31, 1999; each of which is assigned to the assigned hereof and incorporated herein by reference, in its entirety.

In view of the foregoing, it will be appreciated that the invention overcomes the problems of controlling the search duration in a wireless remote unit by providing appropriate integration interval and number of non-coherent passes to be selected for a corresponding search window size.

The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. In a wireless communication device including a search engine and a microprocessor operably configured to execute searches at a desired search window size from amongst plural possible search window sizes, a method comprising the microprocessor performed steps of:

identifying a currently desired search window size;

identifying at least one search parameter associated with the currently desired search window size which when passed to the search engine allows the search engine to perform a multipath search the duration of which is nominally constant relative to the duration of the plural possible search window sizes; and passing the identified currently desired search window size and search parameter to the search engine to execute the multipath search.

2. The method of claim 1, wherein the at least one search parameter includes at least one of an integration interval and a number of non-coherent passes.

3. The method of claim 2, wherein the at least one of an integaion interval and the number of coherent passes are calculated based on the identified currently defined search window size.

4. The method of claim 3, further comprising:

receiving an interrupt service request from the search engine at expiration of the nominally constant duration; and analyzing search results from the search engine associated with the multipath search.

5. The method of claim 4, wherein the search results include signal power measurements at selective PN offsets within a currently defined search window.

6. The method of claim 2, wherein the at least one of an integration interval and the number of coherent passes axe derived from a look-up table.

7. The method of claim 6, further comprising:

receiving an intert service request from the search engine at expiration of the nominally constant duration; and analyzing search results from the search engine associated with the multipath search.

8. The method of claim 7, wherein the search results include signal power measurements at selective PN offsets within a currently defined search window.

9. The method of claim 1, further comprising assigning or deassigning demodulation elements based on the mulipath search.

10. The method of claim 1, wherein the wireless communication device is a CDMA device.

11. A wireless communication device including a search engine and a microprocessor operably configured to execute searches at a desired search window size from amongst plural possible search window sizes, comprising:

means for identifying a currently desired search window size, means for identifying at least one search parameter associated with the currently desired starch window size which when passed to the search engine allows the search engine to perform a multipath search the duration of which is nominally constant relative to the duration of the plural possible search window sizes; and means for passing the identified currently desired search window size and search parameter to the search engine to execute the multipath search.

12. The device of claim 11, wherein the at least one search parameter includes at least one of an integration interval and a number of non-coherent passes.

13. The device of claim 12, wherein the at least one of an integration interval and the number of coherent passes are calculated based on the identified currently defined search window size.

14. The device of claim 13, further comprising:

means for receiving an interrupt service request from the search engine at expiration of the nominally constant duration; and means for analyzing search results from the search engine associated with the multipath search.

15. The device of claim 14, wherein the search results include signal power measurements at selective PN offsets within a currently defined search window.

16. The device of claim 12, wherein the at least one of an integration interval and the number of coherent passes are derived from a look-up table.

17. The device of claim 16, further comprising:

means for receiving an interrupt service request from the search engine at expiration of the nominally constant duration; and means for analyzing search results from the search engine associated with the multipath search.

18. The device of claim 17, wherein the search results include signal power measurements at selective PN offsets within a currently defined search window.

19. The device of claim 11, wherein the search results include signal power measurements at selective PN offsets within a currently defined search window.

20. The device of claim 11, wherein the wireless communication device is a CDMA device.

* * * * *